March 29, 1966     A. R. BOGSTEN     3,242,553
CUTTER
Filed May 8, 1964     5 Sheets-Sheet 1
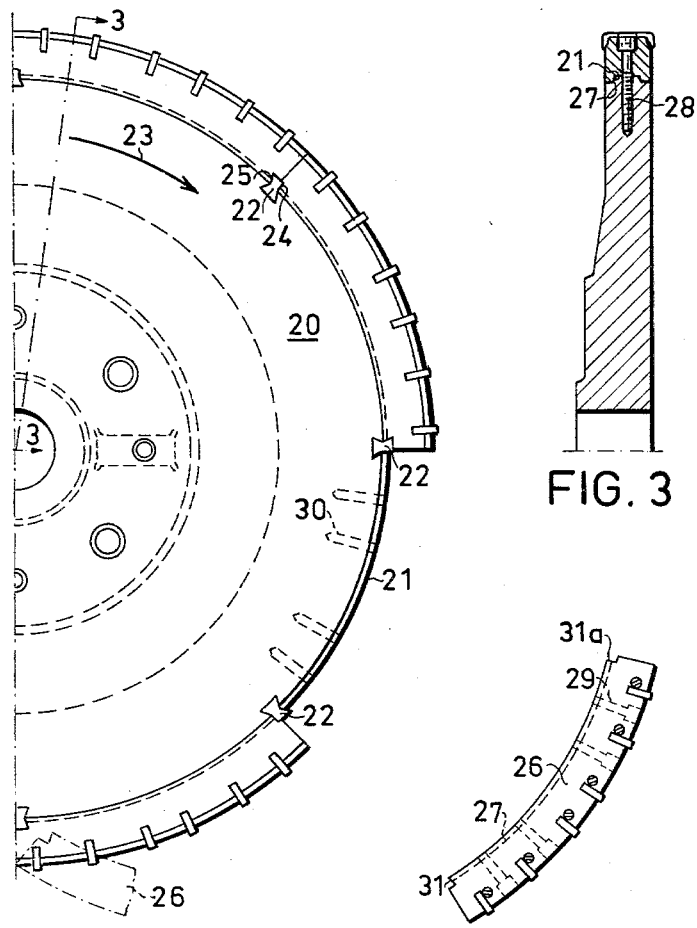

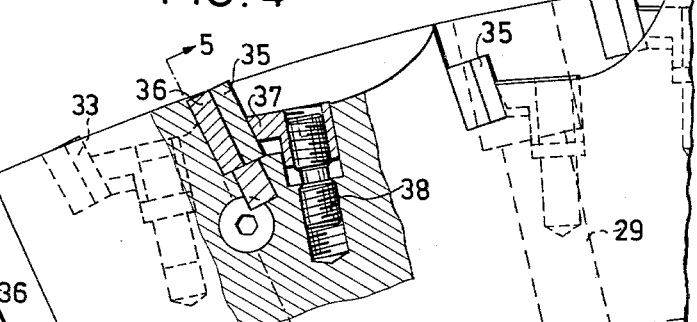
FIG. 4
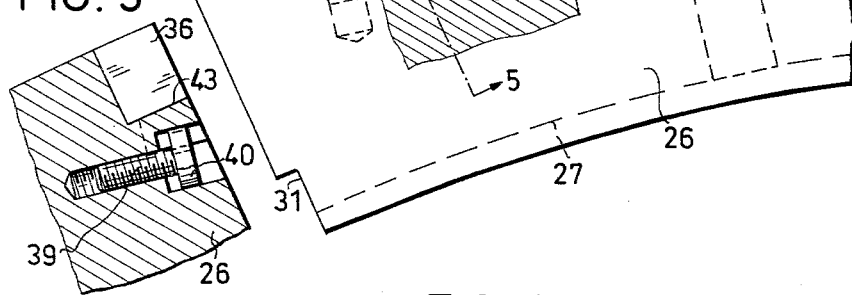
FIG. 5
FIG. 6
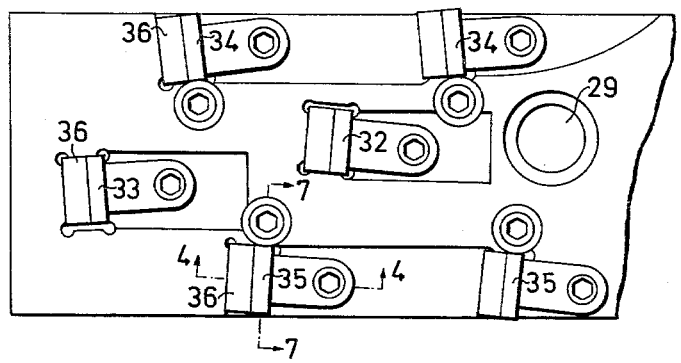
FIG. 7
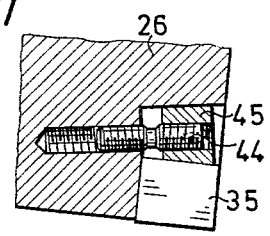

March 29, 1966        A. R. BOGSTEN        3,242,553
CUTTER
Filed May 8, 1964        5 Sheets-Sheet 3
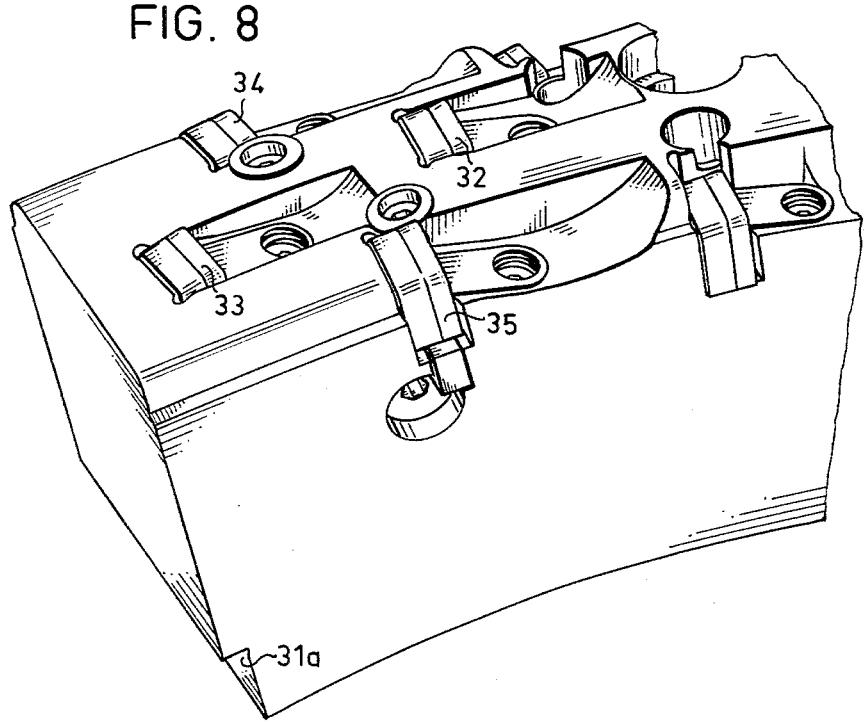
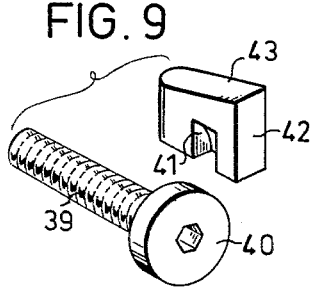
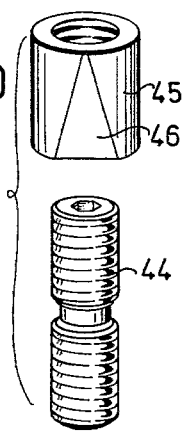

March 29, 1966 A. R. BOGSTEN 3,242,553
CUTTER
Filed May 8, 1964 5 Sheets-Sheet 4

3,242,553
CUTTER
Anders Richard Bogsten, Sodertalje, Sweden, assignor to Aktiebolaget Scania-Vabis, a corporation of Sweden
Filed May 8, 1964, Ser. No. 365,910
9 Claims. (Cl. 29—105)

The present invention relates to cutters and particularly to cutters of relatively great diameter.

The general object of the invention is to provide a cutter having a central disc and a number of arcuate segments detachably secured thereto and provided each with a plurality of exchangeable cutter teeth.

Another object is to provide a cutter having rapidly exchangeable segments which may be accurately positioned on the central disc.

Still another object is to provide a cutter having a central disc and a number of arcuate segments detachably secured thereto in positively fixed positions.

These and other objects of the invention are obtained by means of a cutter which according to the invention is substantially characterised in that the central disc and the segments have cooperating guides extending in the longitudinal direction of the segments and preventing displacement of the segments transversely relative to the guides, and in that the segments are detachably secured to the central disc by means of fastening screws which press the segments against the central disc, and in that the teeth are detachably and adjustably secured to the segments by means of screws. The cutter according to the invention may advantageously be formed to serve as a cutter for cutting crank webs and similar objects. However, it may also be formed to serve as a facing cutter or scraping cutter.

In the annexed drawings three embodiments of the invention are shown by way of example.

Figure 11:
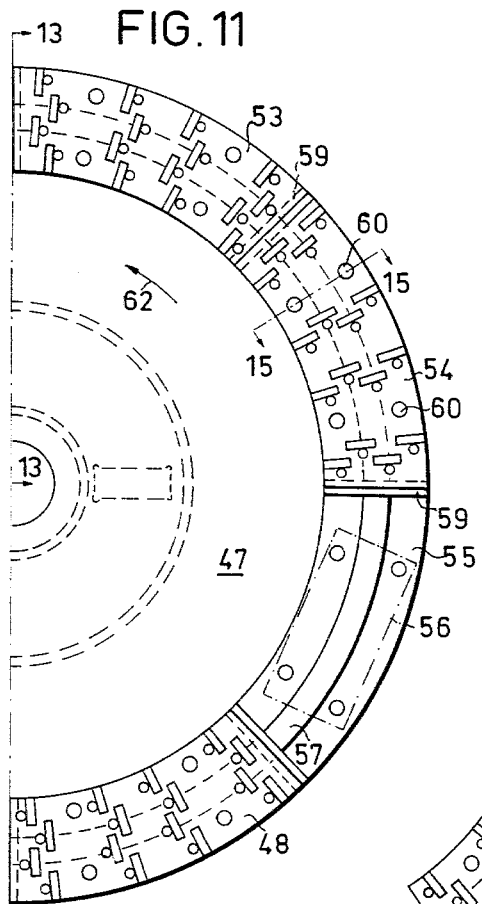
Figures 12, 13:
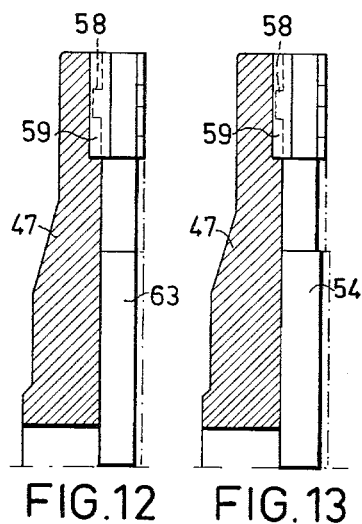
Figures 14, 15:
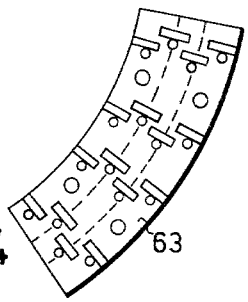
Figure 16:
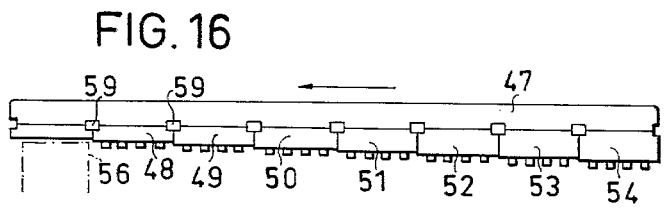
Figure 17:
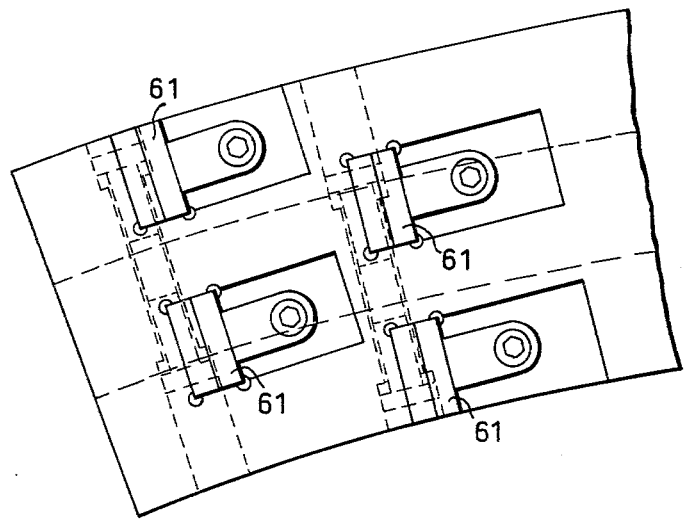

FIG. 1 shows diagrammatically half of a cutter for eight identical segments mounted along the circumference of the central disc except one which is shown separately in FIG. 2. FIG. 3 is a cross-section along line 3—3 in FIG. 1 and illustrates particularly the guide rib on the circumference of the central disc engaged by a corresponding groove in the bottom surface of the segment. FIG. 4 is a partial side view of a segment for the cutter shown in FIG. 1 and illustrates a clamping device for the cutter teeth shown in section along line 4—4 of FIG. 6. FIG. 5 is a cross-section on line 5—5 of FIG. 4 illustrating a device for radial adjustment of the teeth. FIG. 6 is a plan view of the segment in FIG. 4. FIG. 7 is a sectional view along line 7—7 in FIG. 6 and illustrates a device for axial adjustment of the teeth. FIG. 8 is a perspective view of the segment in FIG. 4. FIG. 9 is a perspective view of the details shown in FIG. 5. FIG. 10 is a perspective view of the details shown in FIG. 7. FIG. 11 is a diagrammatic view of half of a cutter having arcuate segments mounted on one side of the central disc and having axial teeth to form either a facing cutter as shown in section in FIG. 12 or a scraping cutter as shown in FIGS. 11, 13 and 16 with one segment omitted to leave space for a work piece. FIG. 13 is a section of the scraping cutter having segments of successively increasing axial thickness. FIG. 14 illustrates separately one of the segments for the facing cutter in FIG. 12. FIG. 15 is a cross-section on line 15—15 of FIG. 11. FIG. 16 is a developed view of the scraping cutter shown in FIGS. 11 and 13 and FIG. 17 is a partial side view on an enlarged scale of the segment shown in FIG. 14 illustrating how the teeth are clamped and may be adjusted.

With reference to FIGS. 1 to 10, the central disc 20 of the cutter is mounted on a driven shaft, not shown. A guide rib 21, slightly wedge shaped in cross-section as shown in FIG. 3, extends along the circumference of the central disc. At spaced intervals equal to the length of the segments a number of transverse abutment wedges 22 are mounted in dovetailed grooves in the periphery of the central disc. The direction of rotation is indicated by an arrow 23. Seen in the direction of rotation the front faces 24 of the wedges are radial, whereas their rear faces are somewhat oblique or undercut.

In the example shown eight identical segments 26 are detachably mounted along the circumference of the central disc between the wedges 22 and have each a guide groove 27 fitting accurately to the rib 21 to prevent transverse displacement of the segments. The segments are tightly pressed against the central disc by means of fastening screws 28 projecting through countersunk radial bores 29 in the segments and engaging threaded bores 30 in the central disc.

Both ends of each segment are provided with recesses for engaging the wedges 22, the forward recess 31 being undercut whereas the rearward recess 32 has a radial abutment surface engaging the forward radial surface of the wedge 22. By means of the fastening screws the segments may easily and rapidly be disconnected from the central disc for exchange.

Each segment has a plurality of relatively closely mounted cutter teeth which have their cuttings edges located radially and axialy outside the surface of the segment. As shown in FIGS. 6 and 8 there are two rows of merely radially adjustable teeth 32 and 33, and one row of teeth 34 and 35 respectively at each edge of the segment which are radially and/or axially adjustable. All teeth are detachably clamped to the segment by means of the devices shown in FIGS. 4 to 7 which as well as the clamping devices are known per se.

Each tooth consists of a small cutter pate of hard metal sintered carbide having a number of cutting edges along its periphery. When the operating edge is worn out, the clamping device may be easily loosened so that the cutter plate may be turned to bring a sharp edge in operating position. Each cutter plate 32, 33, 34 and 35 respectively is associated with a back plate 36 in a conventional manner.

The clamping device consists of a wedge plate 37 and a stud 38 having a right hand and a left hand thread, one thread engaging a threaded bore in the wedge plate and the other thread engaging a threaded bore in the segment.

As shown in FIGS. 4, 5 and 9 the device for radial adjustment of the teeth 32, 33, 34 and 35 comprises a screw 39 having a head 40 which engages a groove 41 in a wedge 42 which by means of the screw 39 is moved axially to raise or lower the tooth supported by the wedge surface 43.

The axial adjustment of the teeth 34 and 35 is effected by means of a double threaded stud 44 having right and left hand threads, one thread engaging a threaded radial bore in the segment and the other thread engaging a cylindrical sleeve 45 having a wedge surface 46 cooperating with the side edge of the respective tooth to force the tooth axially outwardly when the sleeve 45 is moved radially inwardly.

To each central disc belongs two complete sets of segments with cutter teeth. When one set is mounted on the central disc, the other set is being prepared for exchange, when necessary, with that on the central disc. When preparing a segment it is mounted on a fixture having the same dimensions as a certain portion of the central disc. Accordingly, all the teeth may be turned or exchanged and adjusted quickly to very accurate positions which they shall have when the segment is to be mounted on the central disc.

When required the segments on the central disc may be exchanged with those prepared on the fixture, and this exchange may be made very rapid so that the time of standing still for the cutter is kept very short.

It is preferred to use cutter plates of standard size so that when all cutting edges are worn out, the plate is not sharpened but may be replaced by a new cutter plate.

As understood from the above the cutter according to the invention enables a rapid change of segments without it being necessary to take out the central disc from the milling machine. This is an important advantage particularly when the diameter of the cutter is relatively great. Further the exchange of the relatively few number of segments and the replacement and adjustment of the tooth may be made accurately and quickly.

Another advantage with the cutter according to the invention is that the cutter teeth may be positioned close to one another which enables a relatively high speed and results in a high cutting capacity.

By means of the cooperating guide rib 21 of the central disc and guide groove 27 of the segments there is quickly obtained a very accurate position of the segment which is further positively located along the circumference of the central disc by means of the fastening screws 28 and the abutment wedges 22. As a matter of fact the front faces 24 of wedges 22 will also take a great part of the peripheral forces so that the fastening screws 28 are mainly used for pressing the segments against the central disc. Furthermore, the oblique rear surface 25 of the wedges 22 will form a lock for the front end of the segments which will prevent the segments from swinging out if the fastening screws 28 should break.

In FIGS. 11, 13 and 16 is shown a central disc 47 having a number of arcuate segments 48 to 54, a free space 55 equal to a segment being left between the segments 48 and 54 for a work piece 56 indicated by dotted lines. In the present example the segments are secured to one side of the central disc which has an annular guide groove 57 for corresponding guide ribs 58 on the segments to prevent them from displacement transverse to the longitudinal direction of the guides. The segments are located between abutment wedges 59 and are secured by means of fastening bolts 60.

Each segment carries a plurality of axially extending teeth 61 which, as shown in FIG. 17, are clamped and adjusted with the same devices as described in connection with FIGS. 1 to 10. The direction of rotation is indicated by arrow 62.

As shown in FIGS. 13 and 16, the segments 48 to 54 have a successively increasing axial width so that the cutting edges of the teeth will be located in mutually displaced planes. Accordingly, the cutter will operate as a scraping cutter for shaping the workpiece 56.

In FIG. 12 is shown a modification of the device in FIG. 11 in which the segment 63 shown in FIG. 14 has been mounted in the space 55 to form a closed row of identical segments 63 having the cutting edges of their teeth in one and the same axial plane as indicated in FIG. 12 to form a facing cutter.

The cutters shown in FIGS. 11 to 17 are constructed basically according to the principles of the invention and have the same advantages as the cutter described in connection with FIGURES 1 to 10.

What I claim is:

1. A cutter comprising a central disc and a number of arcuate segments secured thereto and provided with a plurality of cutter teeth, characterised in that the central disc and the segments have cooperating guides extending in the longitudinal direction of the segments and preventing displacement of the segments transversely relative to the guides, and in that the segments are detachably secured to the central disc by means of fastening screws which press the segments against the central disc, and in that the teeth are detachably and adjustably secured to the segments by means of screws.

2. A cutter according to claim 1, characterised in that the guides are formed by a groove and a rib engaging the groove.

3. A cutter according to claim 2, characterised in that the groove and rib have a slightly wedge shaped cross section.

4. A cutter according to claim 1, characterised in that wedges are secured to the central disc between the segments to form abutments at least for the rearward ends of the segments seen in the direction of rotation.

5. A cutter according to claim 4, characterised in that the rearwardly facing sides of the wedges are undercut and engage correspondingly shaped recesses in the forward ends of the segments.

6. A cutter according to claim 1, characterised in that the segments are mounted on the circumference of the central disc and have radially projecting teeth.

7. A cutter according to claim 6, characterised in that the segments have axially projecting teeth.

8. A cutter according to claim 1, characterised in that the segments are mounted on one side of the central disc and have axially projecting teeth.

9. A cutter according to claim 8, characterised in that at least one of the segments is omitted on the central disc to form a free space for a work piece to be cut, and in that the segments have an increasing axial width to form a scraping cutter.

No references cited.

WILLIAM W. DYER, JR., *Primary Examiner.*

HARRISON HINSON, *Assistant Examiner.*